(12) United States Patent
Klaassen et al.

(10) Patent No.: US 12,253,060 B2
(45) Date of Patent: Mar. 18, 2025

(54) LIQUID DAMPER

(71) Applicant: Siemens Gamesa Renewable Energy A/S, Brande (DK)

(72) Inventors: Jacobus Klaassen, Voorburg (NL); Matthias Lenssen, Hamburg (DE); Martin Moeskjaer, Struer (DK); Marc Seidel, Osnabrück (DE)

( * ) Notice: Subject to any disclaimer, the term of this patent is extended or adjusted under 35 U.S.C. 154(b) by 0 days.

(21) Appl. No.: 18/208,037

(22) Filed: Jun. 9, 2023

(65) Prior Publication Data

US 2023/0407843 A1 Dec. 21, 2023

(30) Foreign Application Priority Data

Jun. 15, 2022 (EP) .................................. 22179223

(51) Int. Cl.
*F03D 13/20* (2016.01)

(52) U.S. Cl.
CPC ........ *F03D 13/20* (2016.05); *F05B 2240/912* (2013.01); *F05B 2260/964* (2013.01)

(58) Field of Classification Search
CPC .... F03D 17/015; F03D 7/0298; F03D 7/0302; F03D 13/20; F03D 80/50; F03D 80/80; F05B 2260/964; F05B 2240/912
See application file for complete search history.

(56) References Cited

U.S. PATENT DOCUMENTS

| | | | |
|---|---|---|---|
| 7,220,104 B2 | 5/2007 | Zheng et al. | |
| 10,738,497 B1* | 8/2020 | Groleau | E04H 12/345 |
| 2016/0215754 A1 | 7/2016 | Seidel | |
| 2018/0313335 A1* | 11/2018 | Vanderwalker | F03D 80/50 |

FOREIGN PATENT DOCUMENTS

| | | | | |
|---|---|---|---|---|
| CN | 201843734 U | | 5/2011 | |
| CN | 111237133 B | | 4/2021 | |
| CN | 112922426 A | * | 6/2021 | |
| CN | 113357094 A | | 9/2021 | |
| EP | 1203155 B1 | | 12/2004 | |
| EP | 2884095 A1 | * | 6/2015 | ............... F03D 1/00 |
| EP | 2889471 A1 | | 7/2015 | |
| EP | 2899397 B1 | | 7/2015 | |
| EP | 3048326 B1 | | 7/2021 | |

* cited by examiner

*Primary Examiner* — David E Sosnowski
*Assistant Examiner* — Maxime M Adjagbe
(74) *Attorney, Agent, or Firm* — Schmeiser, Olsen & Watts, LLP (57) ABSTRACT

A liquid damper for a wind turbine tower includes a damper housing formed from a horizontal lower annulus, a horizontal upper annulus, an essentially cylindrical outer vertical wall and an essentially cylindrical inner vertical wall, wherein the outer diameter of the damper corresponds to the interior diameter of the tower; an operational volume of liquid contained in the damper; and an arrangement of vertical ribs mounted to a vertical wall of the damper. Further provided is a method of assembling a wind turbine.

14 Claims, 7 Drawing Sheets

LIQUID DAMPER

CROSS-REFERENCE TO RELATED APPLICATIONS

This application claims priority to EP Application No. 22179223.7, having a filing date of Jun. 15, 2022, the entire contents of which are hereby incorporated by reference.

FIELD OF TECHNOLOGY

The following relates to a liquid damper.

BACKGROUND

A typical wind turbine comprises a rotor nacelle assembly (RNA) mounted on top of a tower. The height of the tower is determined largely by the length of the rotor blades. During operation of a wind turbine, loads arising from motion of the aerodynamic rotor results in oscillation of the tower. The frequency of oscillation or "natural frequency of the tower" is governed by the overall system, i.e. the mass of the RNA, the structural properties of the tower, the diameter of the aerodynamic rotor, etc. To reduce structural damage, it is usual to provide some kind of damping at the upper level of a wind turbine tower, for example active damping or passive damping.

The power output of a wind turbine depends to a large extent on the rotor diameter, which in turn governs the tower height and structural requirements, so that the natural frequency of the tower can be discussed in terms of rotor diameter (i.e. the diameter of the aerodynamic rotor). For each specific wind turbine, the damper configuration must match the natural tower frequency. This frequency decreases with growing turbine size, e.g. a 3-4 MW wind turbine with a rotor diameter in the order of 120 m can have a natural tower frequency of about 0.3 Hz, while a 15 MW wind turbine with a rotor diameter in excess of 200 m has a significantly lower natural frequency in the order of 0.14 Hz.

It is known to deploy a liquid damper at an upper level of a wind turbine tower. A liquid damper essentially comprises a large container with a quantity of liquid that is free to move or "slosh" about inside the damper. The liquid tends to slosh back and forth in the opposite direction as the tower, and a sufficiently large quantity of liquid can be effective at damping tower oscillations. The natural frequency of the slosh damper needs to be close to the natural frequency of the wind turbine tower. The power export cables of a wind turbine generally extend from the nacelle down into the tower. It is also usually necessary to provide some means of access from the tower into the nacelle. Therefore, the damper must be arranged to one side of the cable bundle, ladder etc. This places a limitation on the maximum width of the damper. While it is possible to arrange several dampers in a vertical stack, the width constraint means that there is a lower limit to tower frequency that can be damped by such a system, i.e. tower frequencies below a certain threshold cannot be damped effectively by such a damper arrangement.

It is also possible to construct a damper so that the tank or container (that holds the liquid) has a toroid shape, allowing the cable bundle to pass through a central opening. However, during operation of a wind turbine, the tower oscillations may comprise a side-to-side component and also a fore-aft component, resulting in a "circular" oscillation. This can result in a "rotational mode" of the liquid in a toroid damper. As a result, the damper fails to counteract the tower oscillations, i.e. the damping effect is essentially absent. Fatigue damage to the tower and other components of the wind turbine may result, shortening the useful lifetime of these parts and adding to the costs of maintenance and repair. A further problem associated with the known toroid damper arises during the assembly and transport stages of the tower. To reduce assembly costs, the damper may be installed in the tower before transporting the tower to the wind turbine installation site. However, without the RNA mass in place on the tower, the natural oscillation frequency of the tower is higher, but the damper is configured only to damp the lower-frequency oscillations of the completely assembled wind turbine. Therefore, the tower may incur structural damage already during the installation and assembly stages.

SUMMARY

An aspect relates to provide a damper for a wind turbine tower that overcomes the problems outlined above.

According to embodiments of the invention, the liquid damper is realised as a toroid damper and comprises a damper housing formed from a horizontal lower annulus or base-plate, a horizontal upper annulus or top-plate, an essentially cylindrical outer vertical wall and an essentially cylindrical inner vertical wall; and wherein the width of the damper housing corresponds to the interior width of the tower. The damper contains an operational volume of liquid, i.e. the quantity of liquid required to achieve the desired damping effect at the target natural frequency when the damper is installed in a wind turbine tower. Furthermore, the liquid damper comprises an arrangement of vertical ribs mounted to a cylindrical wall of the damper.

An advantage of the inventive damper is that the ribs favourably avoid a reduction in damping effect which might otherwise occur when the tower oscillations are "elliptical" in nature as described above. The ribs serve to disrupt the liquid and thereby mitigate the effects of a rotational mode, so that the damper can consistently provide favourable damping performance. Therefore, even though the ribs can be included in the damper without significant expense or design effort, they can make a significant contribution to the performance of the damper.

The inventive damper can make full use of the space available at the upper level of the tower, since the damper can extend to "fill" this space. The size of the damper housing can be such that the damper is "half-full" with the operational damping quantity of liquid, i.e. the height of the liquid is half the height of the damper housing.

According to embodiments of the invention, the wind turbine comprises a tower supporting a rotor nacelle assembly, and an embodiment of the inventive liquid damper installed at an upper level of the tower.

The tower may have a height in the order of 100 m. The rotor nacelle assembly may have a mass in the order of 700 metric tonnes. The aerodynamic rotor may have a diameter in the order of 200 m. These dimensions shall be understood to be exemplary for a wind turbine than benefits from the inventive liquid damper on account of its ability to damp very low natural tower frequencies. However, a wind turbines with other dimensions may be equipped with an embodiment of the inventive damper.

According to embodiments of the invention, the method of assembling a wind turbine comprises steps of installing an embodiment of the inventive liquid damper in an upper level of the tower; adjusting a configuration of the liquid damper for tower transport; placing the wind turbine tower in an upright position at an interim site; transporting the tower to an installation site; adjusting a configuration of the liquid damper for wind turbine operation; and mounting a rotor nacelle assembly onto the tower.

The terms "damper" and "toroid damper" may be used interchangeably in the following. Because the toroid damper essentially extends across the diameter of the tower interior, and contains a quantity of liquid that can move about freely within the damper housing, the damper can be referred to as a "full-size slosh damper" (FSD). A wind turbine tower can be equipped with one or more instances of the inventive toroid damper, as will be explained below.

The liquid inside the damper can be water, any liquid with a density greater than that of water, any mixture such as a saline solution, a glycol solution, etc. Several floating or submerged elements may be included, e.g. balls or spheres that are at least partially submerged in the liquid and which contribute to the dissipation of energy when the liquid sloshes about in the damper.

The liquid damper described herein is particularly suited for use in a wind turbine tower of a wind turbine with a rotor diameter in the order of 200 m or more. The damper may be constructed from a suitable material such as steel.

The outer vertical wall can be regarded as "essentially cylindrical", i.e. it may have a generally cylindrical shape, depending on the shape of the tower at that level. In the case of a right cylindrical tower shape at the damper level, the outer vertical wall may also have a right cylindrical shape. In the case of a tapering tower shape at the damper level, the outer vertical wall may also have a slightly tapered or frustoconical shape. Of course, the outer vertical wall may be assembled by welding a plurality of flat steel plates together, and the resulting polygonal surface has an overall cylindrical shape. Similarly, the inner vertical wall of the damper can be regarded as "essentially cylindrical", even if it is made of welded flat steel sections. In the following, in the context of embodiments of the invention, the term "essentially cylindrical" shall be understood to cover any of the above possibilities.

The interior diameter at the upper level of the tower of such a wind turbine may be assumed to be in the order of 5-8 m or even more, and the outer diameter of the toroid damper can correspond to that tower diameter. The inner diameter of the toroid damper is chosen according to the desired damping frequency as will be explained below, and can be in the order of 2-4.5 m.

In the following, the interior width of the toroid damper shall be understood as the radial distance between the inner wall and the outer wall, and the height of the toroid damper shall be understood as the axial distance between the base-plate and the top-plate.

A toroid damper may be assumed to have a rectangular cross-section, i.e. the toroid shape of the damper housing can be described as a surface of revolution obtained by rotating a rectangle around an axis, for example the vertical tower axis. The shape of the toroid is a hollow rectangle-section ring with a central hole or opening (the cylindrical inner wall of the toroid damper), which can be large enough to accommodate a cable hang-off as well as various other components such as a ladder extending between levels in the tower interior.

A wind turbine usually comprises a steel tower, for example a tower made of stacked steel sections that are assembled on site. For example, a tower section can have a length in the order of 30 m, and may comprise several "cans", i.e. annular arrangements of welded steel plates. A tower section may have flanges at one or both ends for connection to an adjacent tower section. A tower section can be assembled with its longitudinal axis in a horizontal orientation, i.e. the tower section is "lying on its side" during assembly.

At an onshore site, a hybrid construction may be desirable for a wind turbine tower, with a concrete lower portion and a steel upper portion, which as indicated above may comprise several stacked tower sections, each of which can comprise a suitable number of "cans". In an exemplary embodiment of the invention, the damper housing is made of steel, and the outer wall of the damper is formed by a cylindrical section of the tower, i.e. a separate outer wall is not required for the damper. An advantage of this construction is that the damper can fully utilize the space available in the tower interior.

Assembly of the damper can commence with the bottom-plate and top-plate. A suitable number of ribs and the inner vertical wall are then added. The damper is welded to a tower section can as described above, and the damper/can assembly is then joined to further tower section cans, for example by welding, to complete that tower section.

Alternatively, the damper may be constructed by securing an annular arrangement of ribs to the interior surface of a tower section can, and then assembling the damper housing by attaching the outer perimeter of each horizontal annulus (top-plate and bottom-plate) to the can, and attaching the inner perimeter of each horizontal annulus to the upper and lower rim of the inner vertical wall. The housing parts can be connected by welding, for example.

The dimensions of the toroid damper and the quantity of liquid inside the damper are chosen to achieve a desired low oscillation frequency during operation of the wind turbine. Prior to installation and commissioning of the wind turbine, the tower may be transported in a vertical orientation to the installation site. For example, an installation vessel may transport one or more vertical towers to an offshore wind farm site. Without the RNA in place, the oscillation frequency of the tower can be significantly higher than its specified frequency as part of the complete wind turbine system. If the damper of a tower is already filled with liquid according to the operational specification, the liquid in the damper cannot move at the higher required "sloshing frequency" so that the tower oscillations cannot be damped effectively. One way of overcoming this problem would be to fill the dampers to a higher level prior to transport stage (so that the damper natural frequency matches the higher natural frequency of the tower without its RNA), and then to remove the necessary quantity of liquid once the tower is ready to receive its RNA at the installation site. However, this adds to the complexity of the installation procedure and increases the overall installation cost. Therefore, in an exemplary embodiment of the invention, the damper comprises a plurality of bulkheads. Each bulkhead is shaped to partition the damper, i.e. to divide the interior volume of the damper into a corresponding number of smaller volumes. To this end, in one exemplary embodiment of the invention, the upper plate of the toroid damper has at least one opening shaped to accommodate a bulkhead. A bulkhead can be a vertical panel that can be raised or lowered as required. Lowering the bulkhead into the damper results in the desired partitioning; raising the bulkheads to lift them out of the liquid essentially reverses the partitioning. A vertical edge of a bulkhead is shaped to engage with the upright portion of a rib of the toroid damper, for example the rib acts as a rail to guide the bulkhead. In such an embodiment, openings for the bulkheads are aligned with the corresponding ribs. After assembling the damper by securing it to a tower section can as explained above, the manufacturer of the tower section can place the bulkheads in the "transport position", i.e. so that the bulkheads partition the damper into multiple sections.

As explained above, a tower can be assembled from a stack of tower sections. This can be done at a quay-side, for example prior to transporting the assembled tower by ship. The operational damping quantity of liquid is filled into the damper, for example through an inlet port in the top-plate. As mentioned above, any bulkheads of the damper can already be in their "transport position" so that, during transport, the damper will be effective at damping higher natural frequencies. That tower section is then raised and tilted into a vertical orientation for mounting to a lower tower section. Already at this early stage in tower assembly, the damper is therefore in its "transport mode", with bulkheads in place to ensure that the higher natural frequencies of the tower will be effectively damped right from the outset. The inventive damper therefore advantageously assists in preventing fatigue damage to the wind turbine tower at all times immediately following the tower assembly stage.

As explained above, during operation of a wind turbine, the tower oscillations may comprise a side-to-side component and also a fore-aft component, so that the tower describes an elliptical path as it oscillates. The resulting "rotational mode" of the liquid in the toroid damper would significantly reduce the effectiveness of the damper. The inventive toroid damper comprises an arrangement of upright or vertically oriented ribs mounted to a cylindrical wall, and these act to disrupt the motion of the liquid. The ribs can prevent a "rotational mode" from developing. Even if a rotational mode does develop, the ribs ensure that the liquid flow is disrupted, and therefore ensure sufficient damping even for cases in which a rotational mode develops. The ribs therefore ensure the effectiveness of the damper even when the wind turbine tower oscillations are "elliptical" in nature. The ribs can be equidistantly spaced about the damper. In an exemplary embodiment of the invention, the toroid damper can comprise at least four ribs, more desirably at least six ribs, secured to the outer vertical wall of the tower. In addition, the toroid damper comprises a similar number of ribs or the same number of ribs secured to the inner vertical wall. The ribs may be arranged pairwise, i.e. a rib mounted to the outer damper wall ("outer wall rib") is radially in line with a rib mounted to the inner wall ("inner wall rib"). Equally, the outer wall ribs and the inner wall ribs may be arranged in a staggered fashion. In a further exemplary embodiment of the invention, the number of outer wall ribs may exceed the number of inner wall ribs, e.g. an arrangement with eight inner wall ribs and twelve outer wall ribs. Equally, the ribs may be arranged without any repeating pattern, for example an arrangement of 7 inner wall ribs and 11 or 13 outer wall ribs may help mitigate the effects of a rotational mode. Outer wall ribs and inner wall ribs may differ in size. In an exemplary embodiment, the radial extension of the inner wall ribs is smaller than the radial extension of the outer wall ribs.

A further advantage of the ribs is that they contribute to the stiffness of the damper, i.e. the ribs can prevent or minimize deflections and buckling. In one exemplary embodiment of the invention, a damper rib can be cut from sheet metal. In an alternative exemplary embodiment of the invention, an upright tubular profile is welded to a flat upright plate.

A rib can also serve to strengthen the connection between a cylindrical wall and the top-plate or base-plate. Therefore, in an exemplary embodiment of the invention, a rib of a toroid damper comprises an upright portion mounted to a cylindrical wall and a radial portion mounted to a horizontal annulus. For example, the upright portion of a rib can be attached to the inner cylindrical wall, and the rib can have an upper radial portion extending radially inward along the underside of the damper's upper annulus or top plate, and a lower radial portion extending radially inward along the upper surface of the damper's lower annulus or baseplate.

In a particularly exemplary embodiment of the invention, the transition between the upright portion of a rib and a radial portion is curved, i.e. a rib does not simply extend outward at a right angle from the upright. Instead, the transition can be gradual, for example in the form of a quarter circle or similar curved shape.

In a further exemplary embodiment of the invention, the transition between the upright portion of a rib and a radial portion comprises a rounded cut-out. This shape has the advantage of reducing stress concentrations, such that deformation of the tower as it oscillates does not translate to significant stress on the damper structure.

The ribs are relatively unobtrusive, i.e. they do not significantly hinder the movement of the liquid in the damper interior. In an exemplary embodiment of the invention, the radial extension of a rib is at most 50% of the interior width of the toroid damper. The height of a radial extension may also be quite small compared to the height of the damper, for example the height of a radial extension of a rib may be at most 30% of the height of the toroid damper.

In an exemplary embodiment of the invention, a damper assembly can comprise several toroid dampers, spaced apart in a vertical "stack" configuration. Between any two dampers, a sufficiently large gap ensures enough space for a technician to service each of the toroid dampers. For example, a vertical stack configuration of multiple dampers can have gaps of 1.5 m between adjacent dampers.

In one exemplary sequence of steps, a liquid damper is installed in a wind turbine tower at a quay-side location. The toroid damper is filled with the designated volume or operational volume of liquid, i.e. the volume of liquid that will, later on, result in the desired damping behaviour during operation of the wind turbine. To adjust the configuration of the liquid damper for tower transport, the bulkheads of the toroid damper are placed to partition the interior volume of the damper. The tower is then transported to the wind turbine installation site, where the tower is secured to a supporting structure, e.g. to a transition piece on top of a monopile foundation. Once the tower is in place, the RNA can be mounted to the top of the tower. Prior to this step, to adjust the configuration of the liquid damper for wind turbine operation, the bulkheads of the toroid damper are re-positioned to reverse the partitioning, so that movement of the liquid in the damper is no longer constrained.

In a further exemplary embodiment of the invention, a bulkhead can be secured to the bottom plate of the damper by a hinged connector. For transport of the tower, all such bulkheads are arranged in an upright position and secured to the top-plate. After installing the tower, each bulkhead is released and is allowed to fall to one side, resting permanently on the floor of the damper.

In some situations, such as manufacturing, inspection or maintenance/repair, it may be desirable to access the interior of a toroid damper. Therefore, in an exemplary embodiment of the invention, the upper annulus of a toroid damper comprises one or more access openings. An access opening can be an arc-shaped aperture. An access opening is large enough to allow a person to enter the damper interior. The damper housing comprises a corresponding number of lids or covers. Each cover is shaped to fit over an access opening. A cover may be connected to the top plate by one or more hinges at an edge of an access opening. Alternatively, a cover may simply lie on the top plate so that it can be moved to one side to reveal the access opening. Spring-loaded clips or bolts may be deployed to keep the cover in place. In an exemplary embodiment, each outer wall rib acts as a guide for a bulkhead during a transport and installation stage. The top-plate includes narrow radial openings for the bulkheads. Any access opening formed in the top-plate is placed in the space between such radial slits.

A further advantage of the access openings of the inventive damper is in a simplification of the manufacturing procedure, for example it is straightforward to provide the "inside surface" of the damper with a protective coating. Such a coating may be applied after the damper has been welded to a tower section can. With the partially assembled tower section still in a horizontal position (i.e. lying on its side) as explained above, it is favourably straightforward to access the damper interior in order to apply such a protective coating.

BRIEF DESCRIPTION

Some of the embodiments will be described in detail, with reference to the following figures, wherein like designations denote like members, wherein.

DETAILED DESCRIPTION

Figure 1:
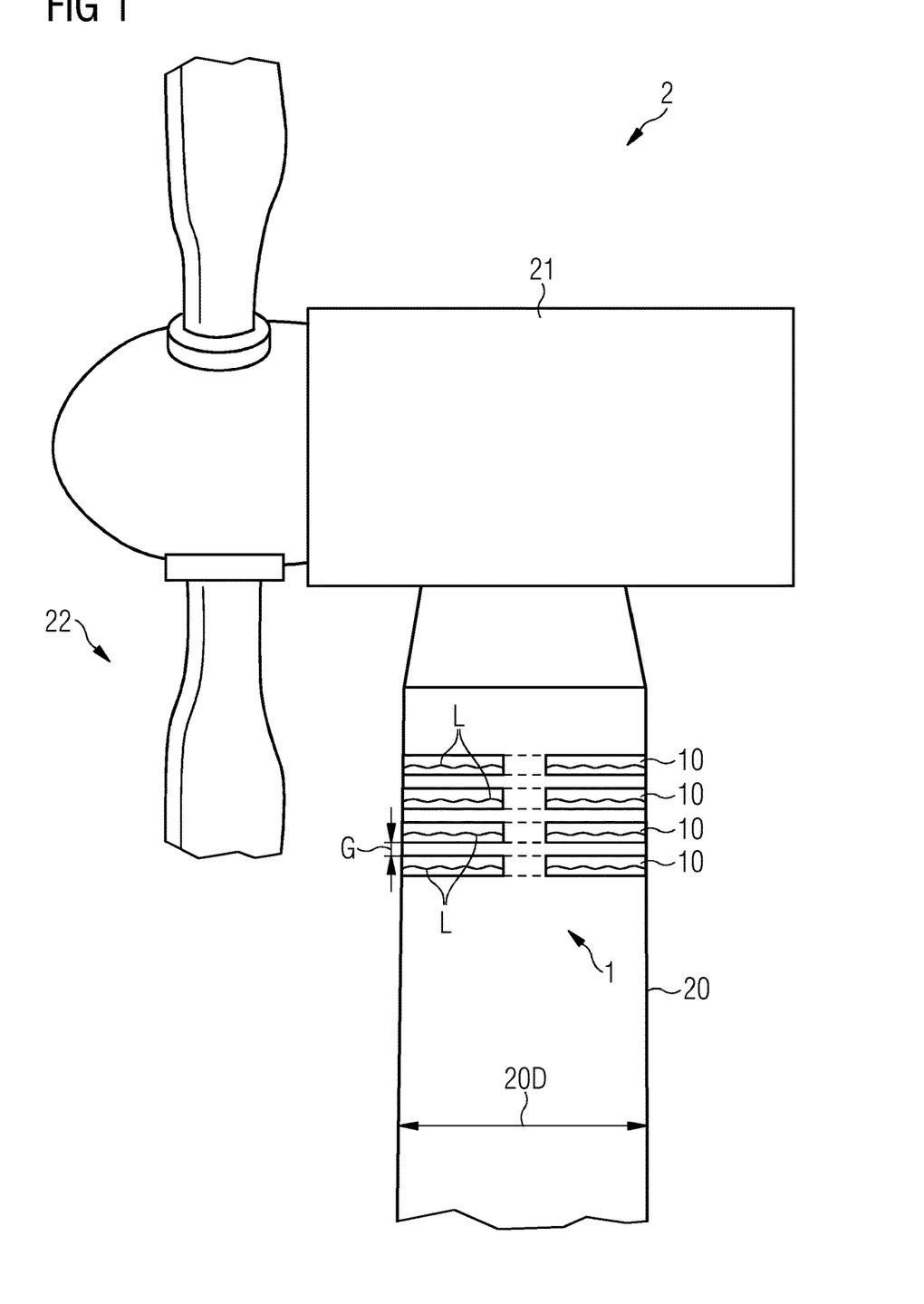
FIG. 1 shows an exemplary embodiment of the inventive liquid damper.

FIG. 1 shows an assembly with several instances of the inventive liquid damper 1 installed in a wind turbine 2, and FIGS. 2-6 shows details of exemplary embodiments of the inventive damper.

In FIG. 1, several dampers 1 are installed at the upper level of a wind turbine tower 20, but it shall be understood that the wind turbine tower may be equipped with a single instance of the inventive damper 1. The tower 20 supports an RNA 21, 22 comprising an aerodynamic rotor 22 and a nacelle 21, which houses the generator and various other components. The mass of the RNA 21, 22 can be in the order of 700 t, the rotor diameter 22D can be in the order of 220 m or more, and the height of the tower 20 can be in the order of 100 m or more.

Each of the toroid dampers 1 can be comparatively "flat" and favourably straightforward to manufacture and to install, but together the dampers can contain a large quantity of liquid.

The toroid dampers 1 (four are shown here) are arranged in a vertical configuration or "stack", with a gap G between adjacent dampers 1. Each toroid damper 1 comprises a housing formed from a horizontal lower annulus 10B or base-plate, a horizontal upper annulus 10T or top-plate, a cylindrical outer vertical wall 10W1 and a cylindrical inner vertical wall 10W2. The central openings of the dampers 1 align as shown, to accommodate export power cables as well as other components such as an access ladder, power cables for auxiliaries, etc. For the sake of clarity, these components are not shown in the diagram.

The outer diameter 10D of each toroid damper 1 corresponds to the interior width of the tower 20, so that each damper 10 is a "full-size damper" or FSD. Each toroid damper 1 comprises an operational volume of liquid L, for example the dampers 1 each contain the same quantity of liquid.

Figure 2:
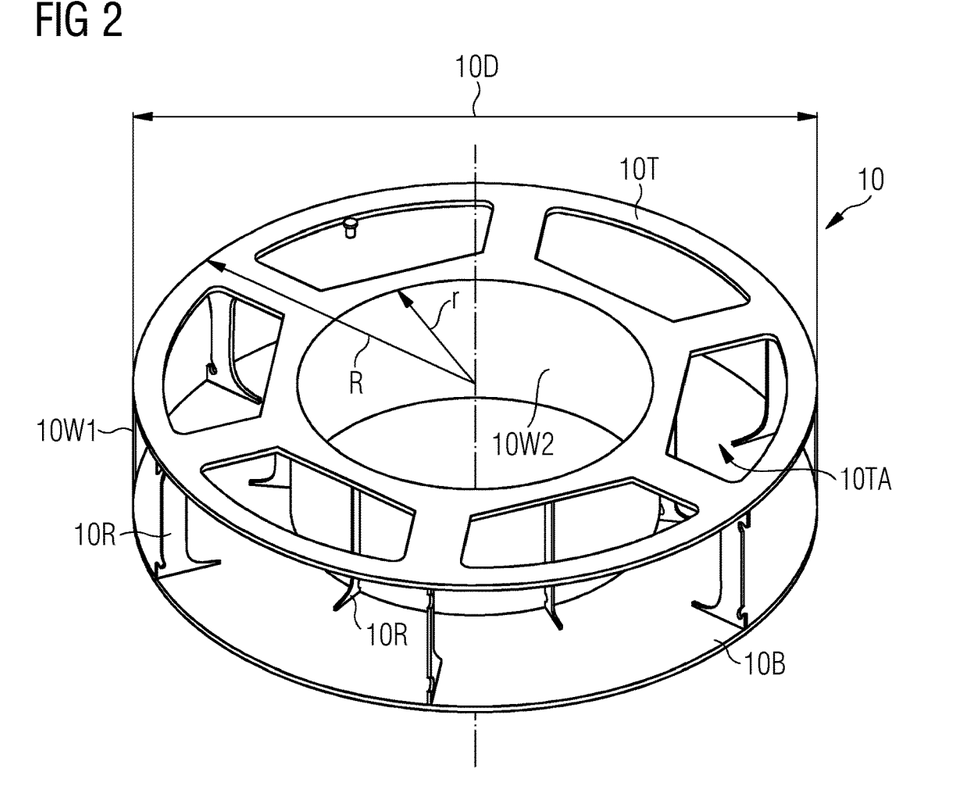
FIG. 2 shows an exemplary toroid damper for use in the liquid damper of FIG. 1.

FIG. 2 shows an exemplary toroid damper 1 for use in the assembly of FIG. 1. The diagram shows the base-plate 10B, the top-plate 10T, and the vertical cylindrical walls 10W2. The top plate 10T has various access openings IOTA, and lids or covers are shown in place over the openings IOTA. A cover 10TC can be moved aside to access the damper interior, as shown here, for example for inspection purposes. The damper 1 can comprise several ribs 10R that serve to minimize stress concentrations.

In an assembly procedure, the base-plate 10B and top-plate 10T are welded into place, for example these may be welded to a tower section can before assembling that tower section as explained above. A suitable number of outer wall ribs 10R are secured to the outer damper wall 10W1, a suitable number of inner wall ribs 10R are secured to an inner vertical wall 10W2 which is then welded to the inner perimeters of the top-plate and bottom-plate.

Alternatively, each horizontal annulus 10T, 10B and the inner wall 10W2 may be provided in the form of sections, and these sections are assembled inside the tower by welding them together. The damper can be assembled "sideways", i.e. starting at one side of the tower wall, damper sections are progressively welded together, moving across the width of the tower, until the damper housing is complete. The assembly of a damper 1 can be carried out during manufacture of the tower 20.

Figure 3:
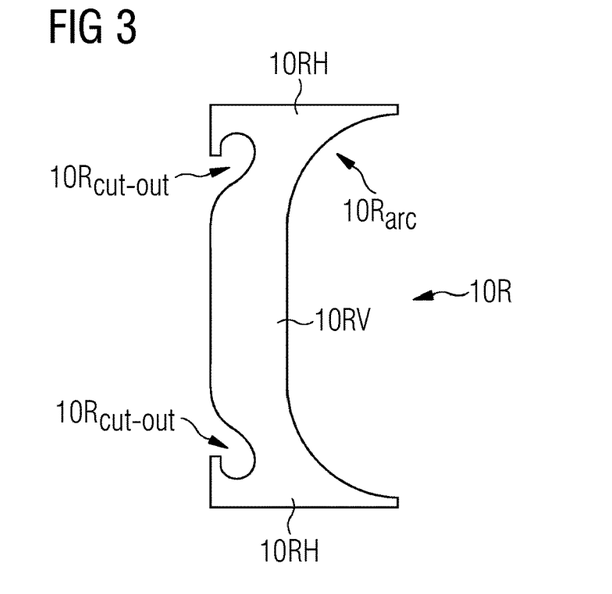
FIG. 3 shows an arrangement of ribs in a toroid damper of the inventive liquid damper.

FIG. 3 shows an outer wall rib 10R in more detail. Each rib 10R has an upright portion 10RV and radial extensions 10RH, with a curved transition 10Rarc, 10Rcut-out between the upright 10RV and each radial extension 10RH. For example, as shown here, each radial extension 10RH can segue into the upright portion 10RV over a quarter circle 10Rarc. In this exemplary embodiment, the upright portion 10RV comprises rounded cut-outs 10Rcut-out, shaped to reduce or minimize stresses in the rib 10R arising from tower deformations during oscillation of the tower 20. This embodiment is particularly effective in the case of a toroid damper 1 whose outer wall 10W1 is welded to the tower wall, since tower deformations are directly transferred to the damper structure.

As described above, the ribs 10R can reduce or eliminate the rotational liquid modes which might develop when the tower oscillations comprise a side-to-side component and also a fore-aft component. By effectively suppressing any such "rotational mode" of the damper liquid, the ribs 10R ensure consistently favourable damping performance. As shown here, the "inner ribs" and "outer ribs" can be provided in a staggered arrangement.

A further advantage of the ribs is that they contribute to the stiffness of the damper, i.e. the ribs can prevent or minimize deflections and buckling. In one embodiment of the invention, a damper rib can be stamped or laser cut from a sheet of steel, for example.

Figure 4:
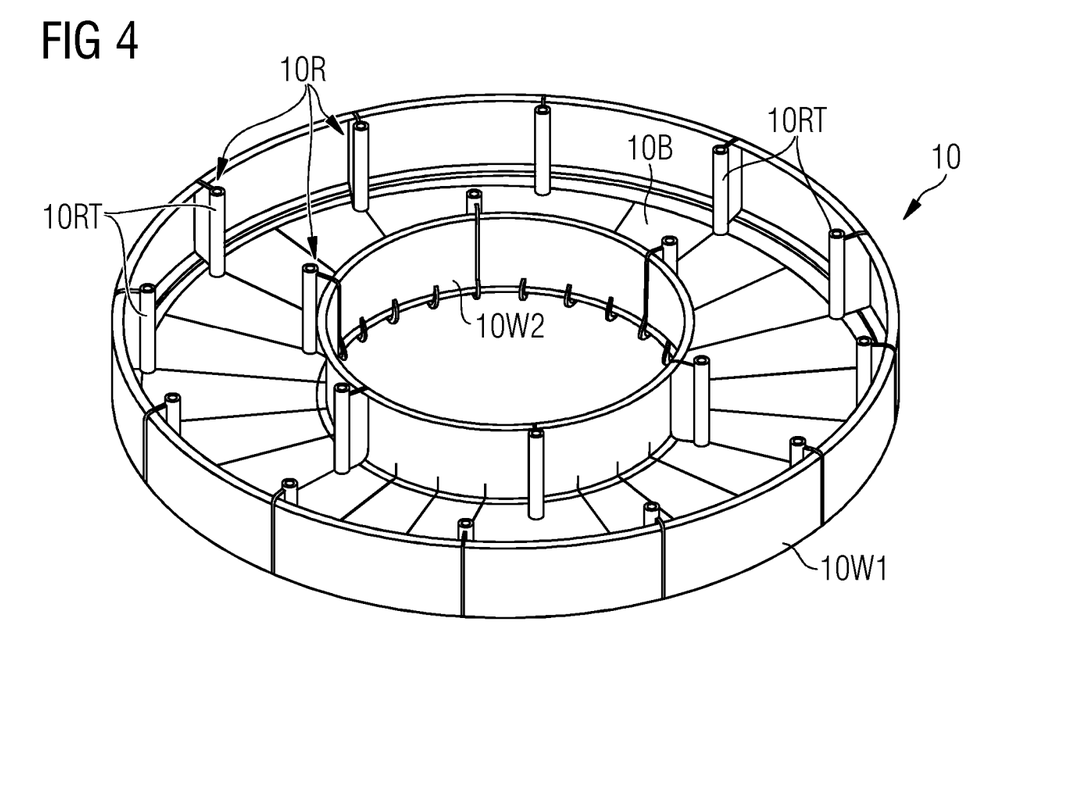
FIG. 4 shows an alternative way of realizing the ribs.

FIG. 4 shows an alternative way of realizing the ribs 10R. Here, each rib 10R of a toroid damper 1 comprises an upright 10RV and a tubular element TORT connected to the upright 10RV. The tubular elements have the effect of optimising the motion of the liquid in the damper, even if the tower is oscillating in both fore-aft and side-to-side directions. The beneficial effect of the ribs in disrupting the fluid flow, particularly if a rotational mode develops, can be augmented by adding surface irregularities to the tubular elements, for example an arrangement of radial fins extending along the outer surface of each tubular element.

Figure 5:
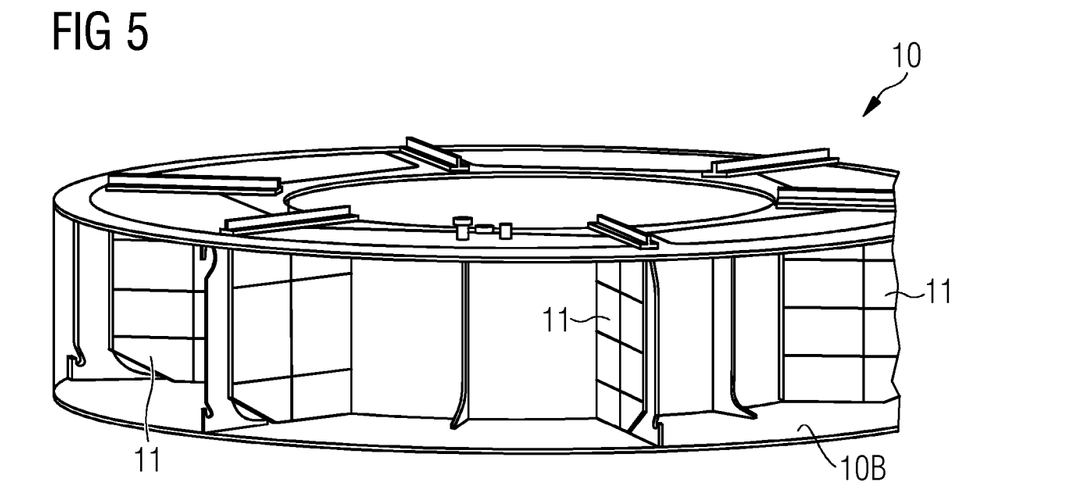
FIG. 5 shows a further exemplary toroid damper.

FIG. 5 shows a further exemplary toroid damper 1. Here, the liquid damper 1 comprises an arrangement of bulkheads 11 to partition the interior cavity of the damper 1. The top-plate 10T of the damper 1 has radial openings to allow the bulkheads 11 to be lowered into the damper interior.

Figure 6:
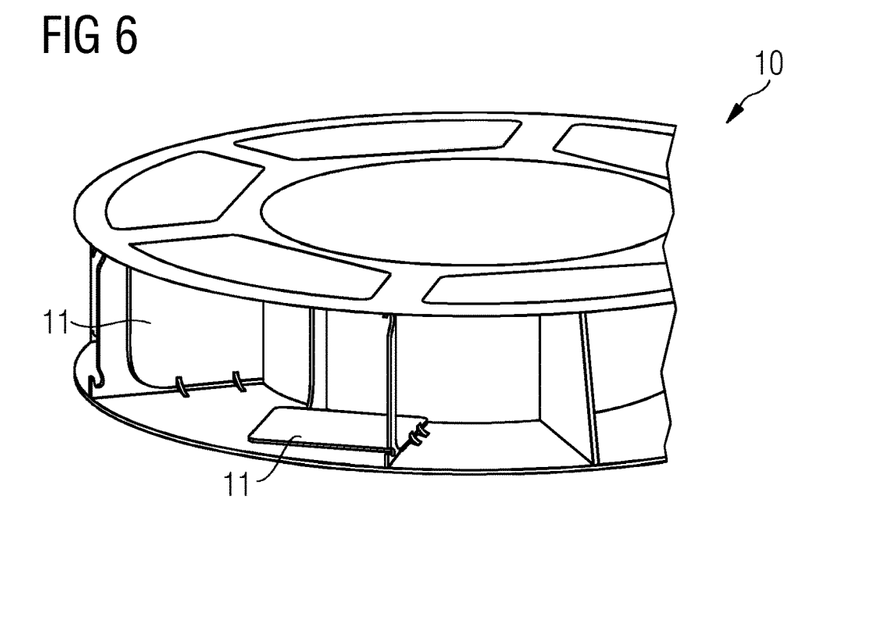
FIG. 6 shows further exemplary toroid dampers for use in the liquid damper of FIG. 1.

FIG. 6 shows a further exemplary toroid damper 1 comprising bulkheads 11. Here, each bulkhead 11 is hinged to the base-plate 10B of the damper 1. Initially, the bulkheads 11 are in a vertical position for the assembly and transport stages of the wind turbine tower 20. Each bulkhead may be secured to the top plate, for example by a suitable fastener. Once the tower is ready to receive the RNA, the fasteners are released, and the bulkheads 11 are allowed to tilt sideways, coming to rest on the bottom plate 10B. The bulkheads 11 remain in this position permanently.

Figure 7:
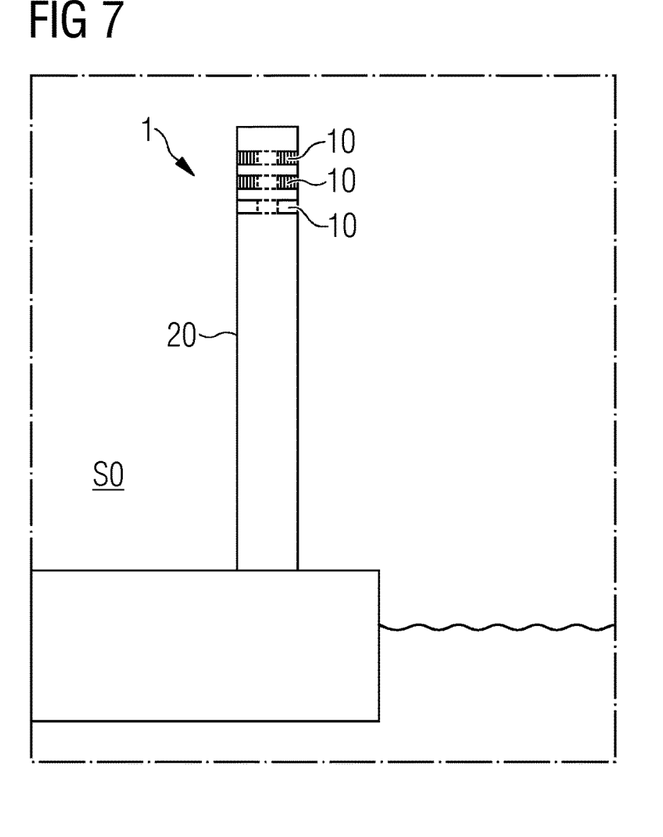
FIG. 7 shows assembly stages of an embodiment of the inventive wind turbine.
Figure 8:
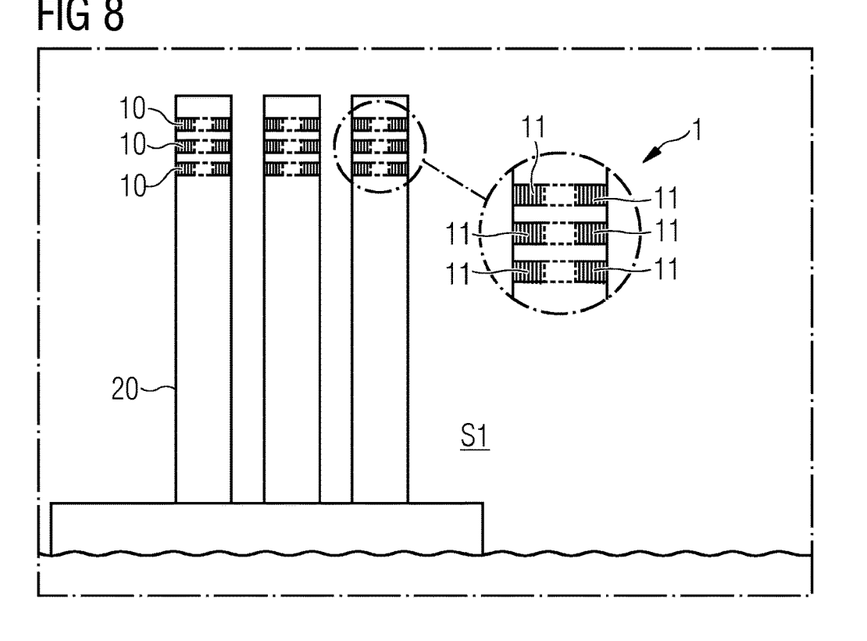
FIG. 8 shows assembly stages of an embodiment of the inventive wind turbine.
Figure 9:
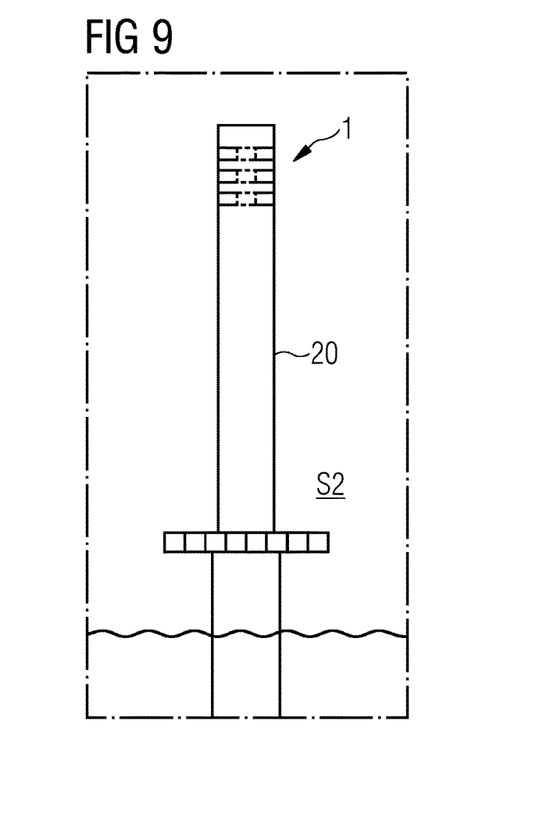
FIG. 9 shows assembly stages of an embodiment of the inventive wind turbine.

FIGS. 7-9 show assembly stages of an embodiment of the inventive wind turbine. In FIG. 7, a tower 20 at a quay-side location S0 is being prepared for transport. A liquid damper 1 as described above has been installed at the upper level of the tower 20 and the toroid dampers 10 have been filled with liquid according to the desired damping of tower oscillations during operation of the planned wind turbine.

In FIG. 8, the tower 20 is shown during transport by marine vessel to the installation site Si. The enlarged view shows that bulkheads 11 have been lowered into the dampers 10 to achieve damping at the higher tower oscillations expected in the absence of the wind turbine's RNA.

In FIG. 9, the tower 20 has been mounted onto a transition piece 20P at the installation site, and the RNA 21, 22—a nacelle 21 and aerodynamic rotor 22—has been installed at the top of the tower. In preparation for this stage of assembly, the bulkheads 11 have been raised from the dampers 10 which are now no longer partitioned, so that the liquid damper 1 can achieve the desired damping of the lower-frequency tower oscillations during normal operation of the wind turbine 2. Bulkheads 11 as described in FIG. 5 above can be removed, since they are no longer required during the remaining lifetime of the wind turbine. The bulkheads 11 can be stored in the tower, or they may be re-deployed in the transport of further towers.

Figure 10:
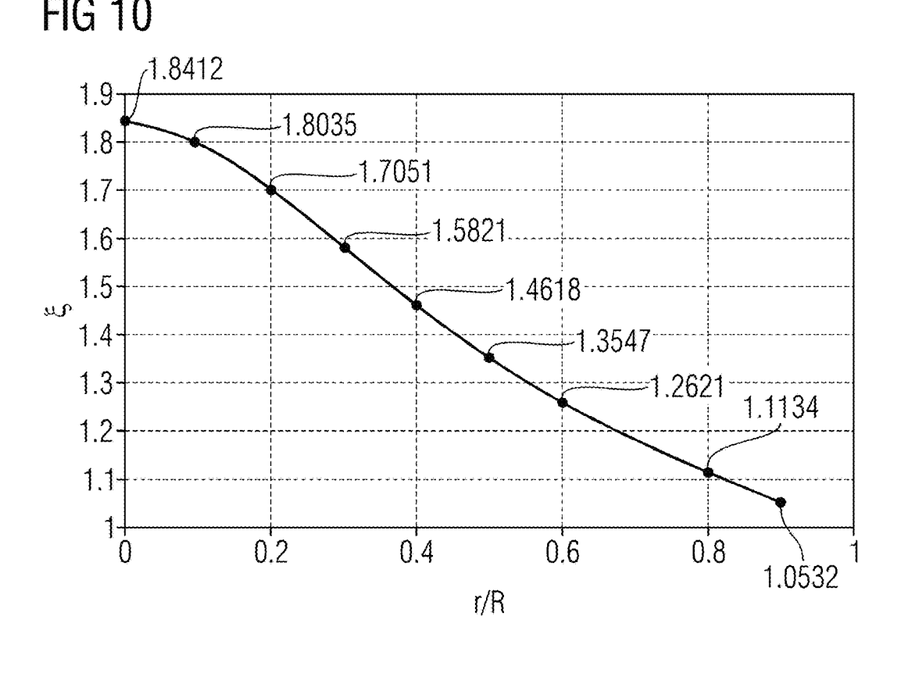
FIG. 10 illustrates a relationship for use in configuring a toroid damper of the inventive liquid damper.

FIG. 10 illustrates a relationship for use in configuring a liquid damper 1 described above. It is known that the natural frequency $f_{10}$ of a toroid damper is expressed as $$f_{10} = \frac{\sqrt{\left(\frac{g}{R} \cdot \xi \cdot \tanh\left(\xi \frac{h}{R}\right)\right)}}{2\pi} \quad (1)$$

where g is the standard gravity value, R is the outer radius of the damper, h is the height of the liquid in the damper, and $\xi$ is a coefficient that is a function of the ratio of inner toroid radius to outer toroid radius. The diagram shows the graph of coefficient $\xi$ (Y-axis, dimensionless) against radius ratio r/R (X-axis, dimensionless). For the inventive damper 1, the larger radius R 1 can be the same as the tower interior radius, i.e. half the tower inner diameter 20D. Working "backwards", i.e. knowing the desired damper frequency $f_{10}$ (the tower's natural frequency), R (the tower interior diameter) and g, values of h and $\xi$ can be chosen that will satisfy equation (1) while maximizing the volume of liquid in the damper.

Figure 11:
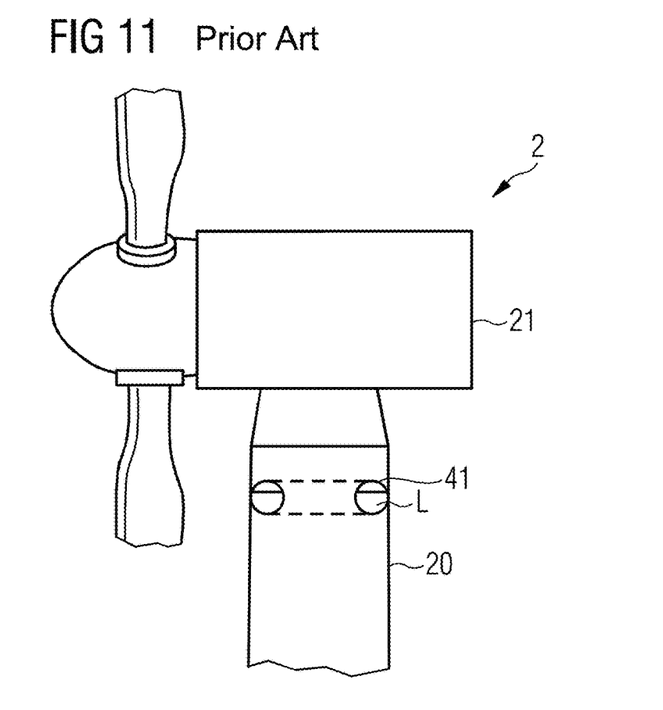
FIG. 11 shows a wind turbine tower equipped with a prior art liquid damper.

FIG. 11 shows a wind turbine tower 20 equipped with a prior art liquid damper 41. Here, the damper 41 is realised as a single toroid or torus arranged in the upper level of the tower. The interior of the toroid damper 41 contains the desired quantity of liquid to achieve the desired degree of damping. However, as explained above, the tower may exhibit both fore-aft and side-to-side oscillations. The liquid in this prior art damper 41 may then follow a circular path about the damper interior instead of moving in the necessary "back and forth" manner. As a result, the prior art damper 41 fails to counteract the tower oscillations, i.e. the damping effect is essentially absent. Fatigue damage to the tower may result. A further drawback of the known toroid damper 41 is its inability to dampen the higher frequency oscillations in the transport and installation phases prior to mounting the RNA on the tower.

Figure 12:
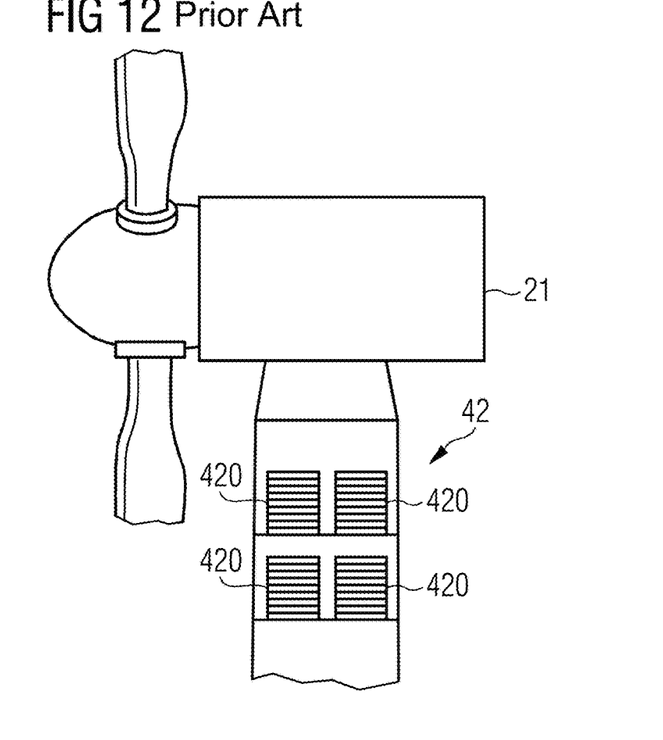
FIG. 12 shows a wind turbine tower equipped with a prior art damper.

FIG. 12 shows a wind turbine tower equipped with a different type of prior art liquid damper 42. Here, the damper 42 comprises multiple stacks of disc-shaped dampers 420, each stack arranged in a secondary containment bucket, with two such stacks arranged side by side on a platform in the upper level of the tower 20. Each disc-shaped damper is raised to the upper tower level during installation. The need to be able to manoeuvre a damper disc within the confines of the tower interior effectively determines the maximum practicable diameter of about 2.25 m. Even with two such stacks of damper discs with the maximum practicable diameter, a satisfactory damping effect cannot be achieved for a wind turbine with a very large rotor diameter and a correspondingly low tower frequency under 0.14 Hz.

Figure 13:
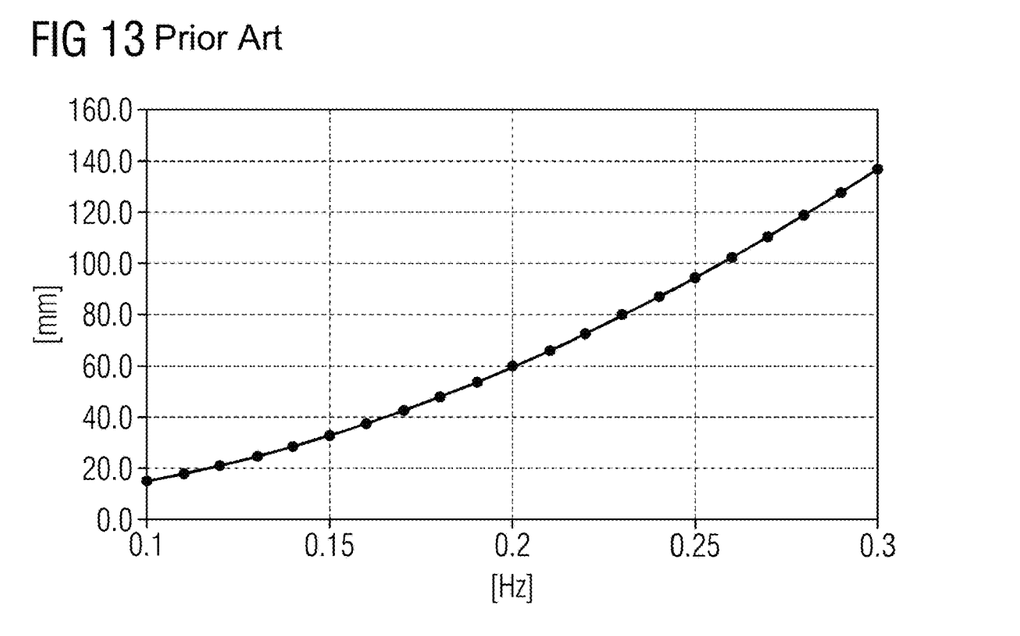
FIG. 13 illustrates a relationship for use in configuring the prior art damper of FIG. 12.

FIG. 13 illustrates a further limitation of the prior art liquid damper of FIG. 12. The diagram shows a graph of liquid level h (Y-axis, mm) against tower frequency f (X-axis, Hz) and demonstrates that a very low tower frequency such as 0.15 Hz or lower is associated with a non-practicable low liquid level in each damper disc. The very low liquid height requires an unreasonably high number of damper discs in order to arrive at the total necessary mass of damper liquid, so that this type of damper is not practicable for towers with very low natural oscillation frequencies.

The dynamics of a wind turbine with a very large rotor diameter in the order of 200 m are such that the tower has a very low natural frequency, but the necessary damping cannot be achieved with the prior art damper 41 of FIG. 11 or the prior art damper 42 of FIG. 12.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A liquid damper for a wind turbine tower, comprising:
   a damper housing formed from a horizontal lower annulus, a horizontal upper annulus, an essentially cylindrical outer vertical wall and an essentially cylindrical inner vertical wall, wherein the outer diameter of the damper corresponds to the interior diameter of the tower;
   an operational volume of liquid contained in the damper; and
   an arrangement of vertical ribs, wherein each vertical rib of the arrangement of vertical ribs is mounted to the outer vertical wall of the damper and/or the inner vertical wall of the damper,
   wherein at least one vertical rib of the arrangement of vertical ribs comprises an upright portion mounted to the outer vertical wall of the damper and/or the inner vertical wall of the damper, a radial portion mounted to the horizontal lower annulus of the damper and/or the horizontal upper annulus of the damper wherein a radial extension of the radial portion is greater than a radial extension of the upright portion, and a curved transition between the upright portion and the radial portion.

2. The liquid damper according to claim 1, comprising at least four ribs or at least six ribs.

3. The liquid damper according to claim 1, wherein the curved transition comprises a rounded cut-out.

4. The liquid damper according to claim 1, wherein at least one vertical rib of the arrangement of vertical ribs comprises a tube attached to an upright portion.

5. The liquid damper according to claim 1, wherein a radial extension of at least one vertical rib of the arrangement of vertical ribs is at most 50% of the interior width of the damper.

6. The liquid damper according to claim 1, comprising a plurality of bulkheads, wherein a bulkhead is shaped to partition the damper.

7. The liquid damper according to claim 1, wherein the horizontal upper annulus of the damper comprises a number of access openings.

8. The liquid damper according to claim 1, comprising a removable cover for each access opening.

9. A wind turbine comprising
   a tower with a height of at least 120 m;
   a rotor nacelle assembly with a mass of at least 700 T, installed on the tower;
   an aerodynamic rotor with a diameter of at least 200 m; and
   the liquid damper according to claim 1 installed at an upper level of the tower.

10. The wind turbine according to claim 9, wherein the outer vertical wall of the liquid damper is formed by an annular section of the wind turbine tower.

11. The wind turbine according to claim 9, comprising a plurality of dampers arranged in vertical stack.

12. The wind turbine according to claim 11, comprising a gap of at least 1.5 m between adjacent dampers.

13. A method of assembling a wind turbine, which method comprises steps of
   installing the liquid damper according to claim 1 in an upper level of a wind turbine tower;
   adjusting a configuration of the liquid damper for tower transport;
   placing the wind turbine tower in an upright position at an interim site;
   transporting the tower to an installation site;
   adjusting a configuration of the liquid damper for wind turbine operation; and
   mounting a rotor nacelle assembly onto the tower.

14. The method according to claim 13, wherein the step of installing the liquid damper in the tower comprises the steps of:
   A) securing an annular arrangement of ribs to the interior surface of the tower;
   B) assembling the damper housing by:
      attaching the outer perimeter of the upper annulus to the tower and attaching the inner perimeter of the upper annulus to an upper rim of the inner vertical wall; and
      attaching the outer perimeter of the lower annulus to the tower and attaching the inner perimeter of the lower annulus to the lower rim of the inner vertical wall; and
   C) filling an operational damping quantity of liquid into the damper.

* * * * *